United States Patent
Spangler et al.

(10) Patent No.: US 9,292,668 B1
(45) Date of Patent: Mar. 22, 2016

(54) SYSTEMS AND METHODS FOR DEVICE AUTHENTICATION

(75) Inventors: Randall R. Spangler, San Jose, CA (US); Sumit Gwalani, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 462 days.

(21) Appl. No.: 13/224,230

(22) Filed: Sep. 1, 2011

(51) Int. Cl.
 *G06F 21/31* (2013.01)
 *H04L 29/06* (2006.01)

(52) U.S. Cl.
 CPC .............. *G06F 21/31* (2013.01); *H04L 63/083* (2013.01)

(58) Field of Classification Search
 CPC .............................. G06F 21/31; H04L 63/083
 USPC ........................................ 726/6; 713/168, 184
 See application file for complete search history.

(56) References Cited

U.S. PATENT DOCUMENTS

| | | | | |
|---|---|---|---|---|
| 6,957,185 B1* | 10/2005 | Labaton | ............. | 704/500 |
| 7,047,559 B2* | 5/2006 | Ohmori | ............. | 726/3 |
| 7,398,348 B2* | 7/2008 | Moore et al. | ............. | 711/103 |
| 7,672,457 B2* | 3/2010 | Nagano et al. | ............. | 380/270 |
| 7,748,031 B2* | 6/2010 | Gonzalez et al. | ............. | 726/9 |
| 8,132,012 B2* | 3/2012 | Labaton | ............. | 713/170 |
| 8,213,617 B1* | 7/2012 | Appleton | ............. | 380/270 |
| 8,312,519 B1* | 11/2012 | Bailey et al. | ............. | 726/6 |
| 2002/0194499 A1* | 12/2002 | Audebert et al. | ............. | 713/201 |
| 2007/0067828 A1* | 3/2007 | Bychkov | ............. | 726/3 |
| 2007/0220253 A1* | 9/2007 | Law | ............. | 713/168 |
| 2007/0250923 A1* | 10/2007 | M'Raihi | ............. | 726/18 |
| 2008/0168543 A1* | 7/2008 | von Krogh | ............. | 726/6 |
| 2009/0125997 A1* | 5/2009 | Cook | ............. | 726/6 |
| 2009/0235339 A1* | 9/2009 | Mennes et al. | ............. | 726/5 |
| 2010/0031051 A1 | 2/2010 | Machani et al. | | |
| 2010/0263029 A1* | 10/2010 | Tohmo et al. | ............. | 726/6 |
| 2011/0016047 A1 | 1/2011 | Wu et al. | | |
| 2011/0276495 A1 | 11/2011 | Varadarajan et al. | | |

* cited by examiner

*Primary Examiner* — Dede Zecher
*Assistant Examiner* — Jason C Chiang
(74) *Attorney, Agent, or Firm* — McDermott Will & Emery LLP

(57) ABSTRACT

Systems and methods for providing access to secure information are disclosed. In one aspect, a computer-implemented method for providing access to secure information comprises receiving a first one-time password (OTP) from a computing device, and verifying whether the first OTP is valid. The method also comprises, if the first OTP is valid, performing the steps of generating a second OTP for accessing the secure information, and transmitting the second OTP to the computing device. In another aspect, a computer-implemented method for providing access to secure information comprises generating a first one-time password (OTP), and transmitting the first OTP to an OTP device. The method also comprises, in response to the first OTP, receiving a second OTP from the OTP device, and sending the second OTP to a system that controls access to the secure information, wherein the first OTP is different from the second OTP.

16 Claims, 6 Drawing Sheets

SYSTEMS AND METHODS FOR DEVICE AUTHENTICATION

FIELD

The subject disclosure generally relates to authentication, and, in particular, to systems and methods for device authentication.

BACKGROUND

Various security features may be employed to protect a user account with sensitive information from unauthorized access. For example, when a computing device (e.g., laptop computer) attempts to remotely log into an account, an authentication server may require a valid one-time password (OTP) from the computing device before granting access to the account. Unlike a static password, an OTP is not vulnerable to replay attacks. The OTP may be generated by a separate OTP device located near the computing device and communicated from the OTP device to the computing device. The OTP device may be a standalone device (e.g., hardware token) or an application running on a mobile device (e.g., smart phone).

SUMMARY

A computer-implemented method for providing access to secure information is disclosed according to one aspect of the subject technology. The method comprises receiving a first one-time password (OTP) from a computing device, and verifying whether the first OTP is valid. The method also comprises, if the first OTP is valid, performing the steps of generating a second OTP for accessing the secure information, and transmitting the second OTP to the computing device.

A system for providing access to secure information is disclosed according to one aspect of the subject technology. The system comprises one or more processors, and a machine-readable medium comprising instructions stored therein, which when executed by the one or more processors, cause the one or more processors to perform operations. The operations comprise receiving a first one-time password (OTP) and an identifier from a computing device via a wireless link, determining whether the received identifier is in an access list, and verifying whether the first OTP is valid. The operations also comprise, if the first OTP is valid and the received identifier is in the access list, performing the steps of generating a second OTP for accessing the secure information, and transmitting the second OTP to the computing device via the wireless link.

A machine-readable medium is disclosed according to an aspect of the subject technology. The machine-readable medium comprises instructions stored therein, which when executed by a machine, cause the machine to perform operations. The operations comprise receiving a first one-time password (OTP) from a computing device via a wireless link, generating a second OTP, and verifying whether the first OTP matches the second OTP. The operations also comprise, if the first OTP matches the second OTP, performing the steps of generating a third OTP for accessing the secure information, wherein the third OTP is different from the first OTP, and transmitting the third OTP to the computing device via the wireless link.

A computer-implemented method for providing access to secure information is disclosed according to an aspect of the subject technology. The method comprises generating a first one-time password (OTP), and transmitting the first OTP to an OTP device. The method also comprises, in response to the first OTP, receiving a second OTP from the OTP device, and sending the second OTP to a system that controls access to the secure information, wherein the first OTP is different from the second OTP.

A system for providing access to secure information is disclosed according to one aspect of the subject technology. The system comprises one or more processors, and a machine-readable medium comprising instructions stored therein, which when executed by the one or more processors, cause the one or more processors to perform operations. The operations comprise generating a first one-time password (OTP), and transmitting the first OTP to an OTP device via a wireless link. The operations also comprise, in response to the first OTP, receiving a second OTP from the OTP device via the wireless link, receiving a password from a user, and sending the second OTP and the password to a system that controls access to the secure information, wherein the first OTP is different from the second OTP.

A machine-readable medium is disclosed according to an aspect of the subject technology. The machine-readable medium comprises instructions stored therein, which when executed by a machine, cause the machine to perform operations. The operations comprise generating a first one-time password (OTP), and transmitting the first OTP and an identifier to an OTP device via a wireless link, wherein the identifier uniquely identifies a computing device. The operations also comprise, in response to the first OTP and the identifier, receiving a second OTP from the OTP device via the wireless link, and sending the second OTP to a system that controls access to the secure information, wherein the first OTP is different from the second OTP.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
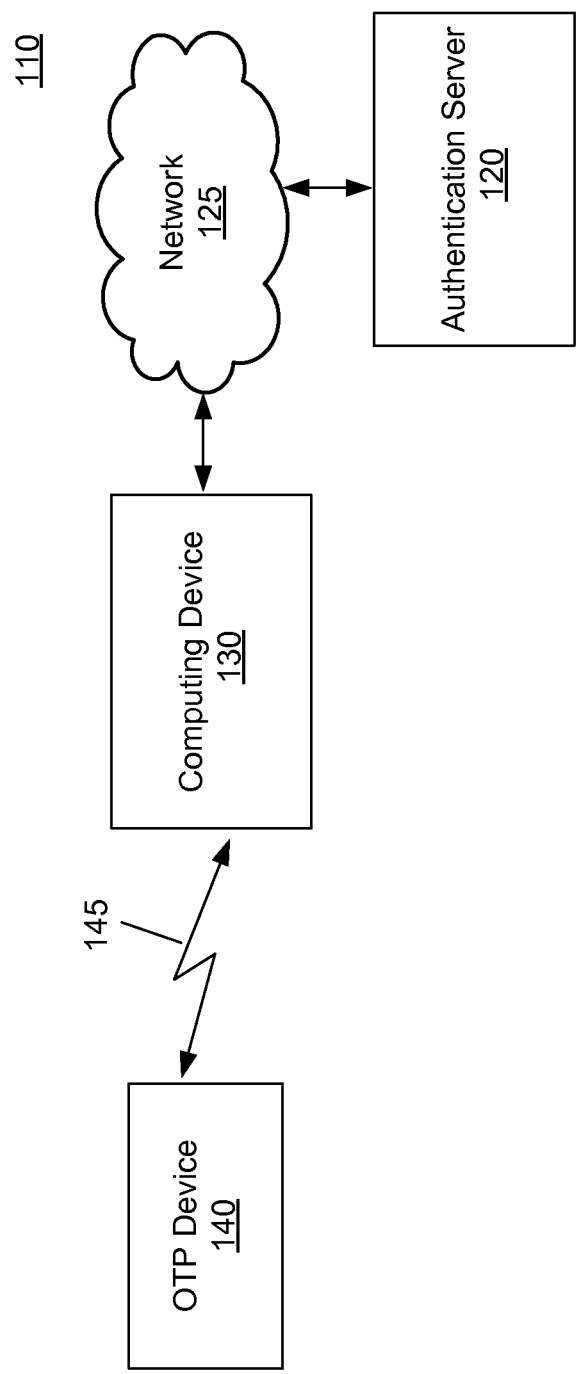
FIG. 1 shows a system according to an aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Various security features may be employed to protect a user account with sensitive information from unauthorized access. For example, when a computing device (e.g., laptop computer) attempts to remotely log into an account, an authentication server may require a valid one-time password (OTP) from the computing device before granting access to the account. Unlike a static password, an OTP is not vulnerable to replay attacks. The OTP may be generated by a separate OTP device located near the computing device and communicated from the OTP device to the computing device. The OTP device may be a standalone device (e.g., hardware token) or an application running on a mobile device (e.g., smart phone).

The OTP device may communicate with the computing device via a wireless link. For example, the computing device may request an OTP for accessing an account from the OTP device via the wireless link when the user attempts to log into the account using the computing device. In response to the request, the OTP device may transmit an OTP for accessing the account to the computing device via the wireless link. An advantage of this arrangement is that the user does not have to manually type an OTP displayed on the OTP device into the computing device or physically connect the OTP device to the computing device. However, the OTP device may be susceptible to a security attack. For example, an unauthorized user may employ a device impersonating the computing device to request and obtain an OTP from the OTP device, and use the OTP to gain unauthorized access to the account.

To address this problem, various aspects of the subject technology provide systems and methods for allowing the OTP device to verify that a request for an OTP is from a computing device that is authorized to request the OTP, and to transmit the OTP to the computing device after verifying that the computing device is authorized to request the OTP. In one aspect, the OTP device receives a request OTP from the computing device, verifies that the request OTP is valid, and transmits a separate OTP for accessing the account to the computing device if the request OTP is valid. Thus, the request OTP from the computing device allows the OTP device to verify that the computing device is authorized to request an OTP from the OTP device for accessing an account, and therefore provides an additional layer of security to prevent an unauthorized device from obtaining an OTP from the OTP device.

FIG. 1 shows a system 110 according to an aspect of the subject technology. The system 110 includes an authentication server 120 that controls access to a secure account, a computing device 130, and an OTP device 140. The account may comprise an email account, an online banking account or other account that may include sensitive information.

In one aspect, when the user at the computing device 130 attempts to log into the account, the computing device 130 generates a request OTP, which is generated separately from an OTP generated by the OTP device 140 for accessing the account. The computing device 130 then transmits the request OTP to the OTP device 140 via a wireless link 145. The OTP device 140 verifies that the request OTP from the computing device 130 is valid. If the received request OTP is valid, then the OTP device 140 generates an OTP for accessing the account and transmits the generated OTP to the computing device 130 via the wireless link 145. The computing devices 130 then sends the OTP received from the OTP device 140 to the authentication server 120 (e.g., via a network 125) to access the account.

In one aspect, the computing device 130 may also send a user password (e.g., static password) to the authentication server 120. The user password may be manually typed into the computing device 130 by the user. In this aspect, the authentication server 120 may require both a valid user password and a valid OTP from the computing device 130 before granting access to the account.

Figure 2:
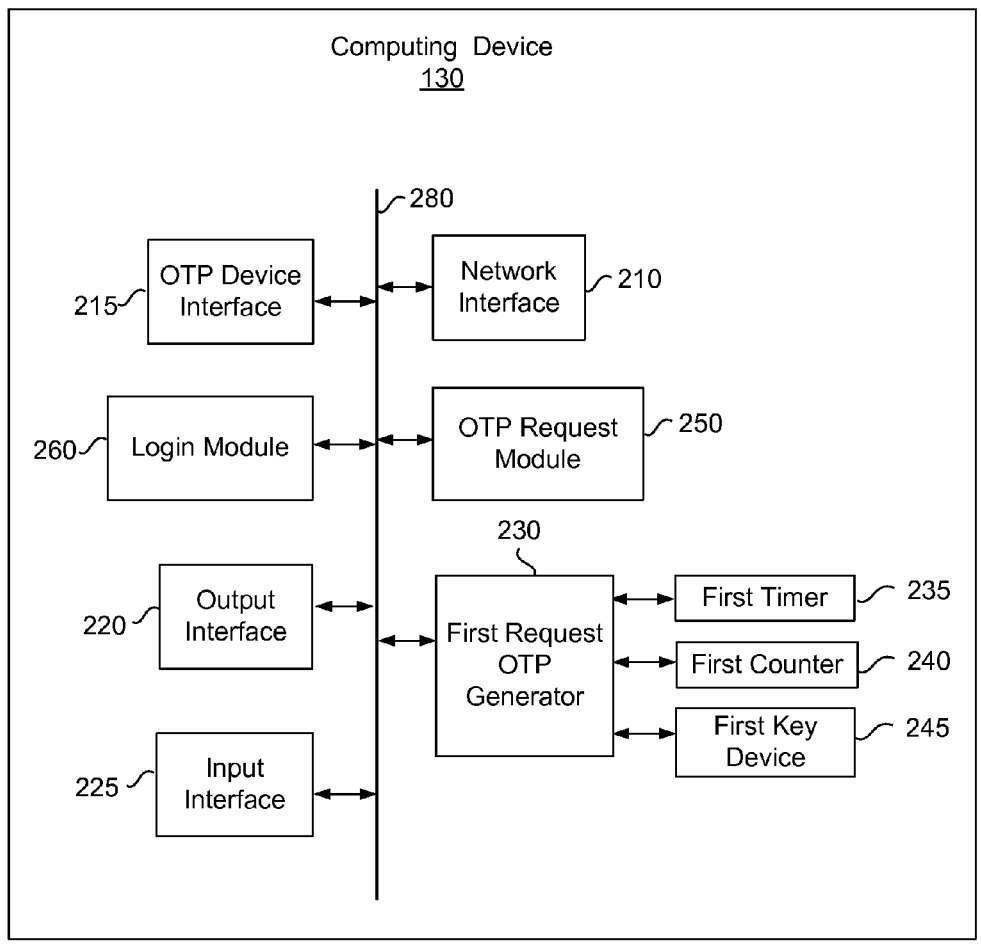
FIG. 2 shows a computing device according to an aspect of the subject technology.

FIG. 2 shows the computing device 130 according to an aspect of the subject technology. The computing device 130 may include a laptop computer, a desktop computer, a tablet or other type of computing device.

The computing device 130 may comprise a network interface 210, an OTP device interface 215, an output interface 220, an input interface 225, an OTP request module 250, a login module 260, and a bus 280. The computing device 130 may also comprise a first request OTP generator 230, a first timer 235, a first counter 240, and a first key device 245. While the computing device 130 is shown in one configuration in FIG. 2, it is to be understood that the computing device may include additional, alternative and/or fewer components.

The bus 280 collectively represents all system, peripheral, and chipset buses that communicatively connect the numerous components of the computing device 130. The modules 250 and 260 may be implemented as a set of computer-readable instructions that are stored in a memory and executed by one or more processors to perform the various processes described herein. The modules 250 and 260 may communicate with other components of the computing device 130 via the bus 280. The modules 250 and 260 are described in further detail below.

The input interface 225 enables a user to communicate information and commands to the computing device 130. For example, the input interface 225 may be coupled to a keyboard and/or a pointing device (e.g., touch pad) to receive commands from the user. In another example, the input interface 225 may be coupled to a touch screen that receives commands from the user by detecting the presence and location of a user's finger or stylus on the touch screen. In one aspect, the input interface 225 may receive a password (e.g., static password) from the user via an input device. For example, the user may manually type the password using a physical keyboard, a soft keyboard on a touch screen or other input device.

The output interface 220 may be used to communicate information to the user. For example, the output interface 220 may output information from the modules to the user on a display (e.g., liquid crystal display (LCD)).

The network interface 210 enables the computing device 130 to communicate with the authentication server 120 via a network 125 (e.g., a local area network (LAN), a wide area network (WAN), an intranet, the Internet, etc.).

The OTP device interface 215 enables the computing device 130 to communicate with the OTP device 140. For example, the OTP device interface 215 may include a wireless communication module for communicating with the OTP device over a wireless link (e.g., a Bluetooth link, a WiFi link, a radio frequency identification (RFID) link, a near-field communication link, an infrared link, etc.). In another example, the OTP device interface 215 may communicate with the OTP device 140 over a wired link, such as a universal serial bus (USB) link.

The first request OTP generator 230 is configured to generate a request OTP (e.g., each time a user attempts to log into an account protected by the authentication server 120 using the computing device 130). As discussed above, the request OTP is sent to the OTP device 140 to request a separate OTP from the OTP device 140 for accessing the account.

In one aspect, the first request OTP generator 230 may be time-based. In this aspect, the first request OTP generator 230 may generate a request OTP by inputting a time value from the first timer 235 into an encryption algorithm. The first timer 235 may be initialized with an initial time value. After initialization, the first timer 235 may increment the time value once every time interval (e.g., 30 seconds). In this aspect, the request OTP changes every time interval (e.g., 30 seconds) since the time value used to generate the request OTP changes every time interval (e.g., 30 seconds). Thus, a particular request OTP generated by the first request OTP generator 230 may be valid for only a short period of time.

In this aspect, the first request OTP generator 230 may also input a secret key from the first key device 245 into the encryption algorithm to generate a request OTP. The secret key may be stored in a register or other type of memory. The secret key may be generated using a pseudo-random algorithm or other method.

In another aspect, the first request OTP generator 230 may be counter-based. In this aspect, the first request OTP generator 230 may generate a request OTP by inputting a count value from the first counter 240 into an encryption algorithm. The first counter 240 may be initialized with an initial count value. After initialization, the first counter 240 may increment the count value each time the user attempts to log into the account using the computing device 130 or some other event. In this aspect, the request OTP changes each time the user attempts to log into the account since the count value used to generate the request OTP changes each time the user attempts to log into the account. Thus, a particular request OTP generated by the first request OTP generator 230 may be valid for only one login session. In this aspect, the first request OTP generator 230 may also input a secret key from the first key device 245 into the encryption algorithm to generate a request OTP.

Therefore, the first request OTP generator 230 may be time-based and/or counter-based. For the aspect in which the first request OTP generator 230 is time-based, the first counter 240 may be omitted. Similarly, for the aspect in which the first OTP generator 230 is counter-based, the first timer 235 may be omitted. The first request OTP generator 230 may implement a time-based one-time password (TOTP) algorithm, a hashed message authentication code (HMAC)-based one-time password algorithm, or other algorithm.

The OTP request module 250 is configured to request an OTP from the OTP device 140 for accessing the account. When the user attempts to log into the account from the computing device 130, the OTP request module 250 may instruct the first request OTP generator 230 to generate a request OTP and provide the generated request OTP to the OTP request module 250. The OTP request module 250 may then generate a request requesting an OTP from the OTP device 140 for accessing the account. The request may include the request OTP generated by the first request OTP generator 230 and an identifier identifying the computing device 130. The identifier may include a media access control (MAC) address, an Internet protocol (IP) address and/or other identifier that uniquely identifies the computing device 130.

The OTP request module 250 may then send the request to the OTP device 140 via the OTP device interface 215.

The login module 260 is configured to login into the account protected by the authentication server 120. In one aspect, the login module 260 may receive an OTP for accessing the account from the OTP device 140 via the OTP device interface 215. The OTP device 140 may send the OTP to the computing device 130 in response to the request from the OTP request module 250, as discussed above. The login module 260 may also receive a password (e.g., static) from the user by prompting the user for a password via the output interface 220 and receiving the password from the user via the input interface 225. Alternatively, the login module 260 may retrieve the password from a memory in the computing device. The login module 260 may then login into the account by sending the OTP from the OTP device 140 and the password to the authentication server 120 via the network interface 210. If the authentication server 120 successfully verifies the OTP and the password, then the authentication server 120 grants the computing device 130 access to the account.

In one aspect, the login module 260 may be configured to automatically request the OTP request module 250 to obtain an OTP from the OTP device 140 each time a login attempt is made using the computing device. In another aspect, the login module 260 may first contact the authentication server 120 to determine whether an OTP is required to log into an account. If the authentication server 120 indicates that an OTP is required, then the login module 260 may request the OTP request module 250 to obtain an OTP from the OTP device 140.

Figure 3:
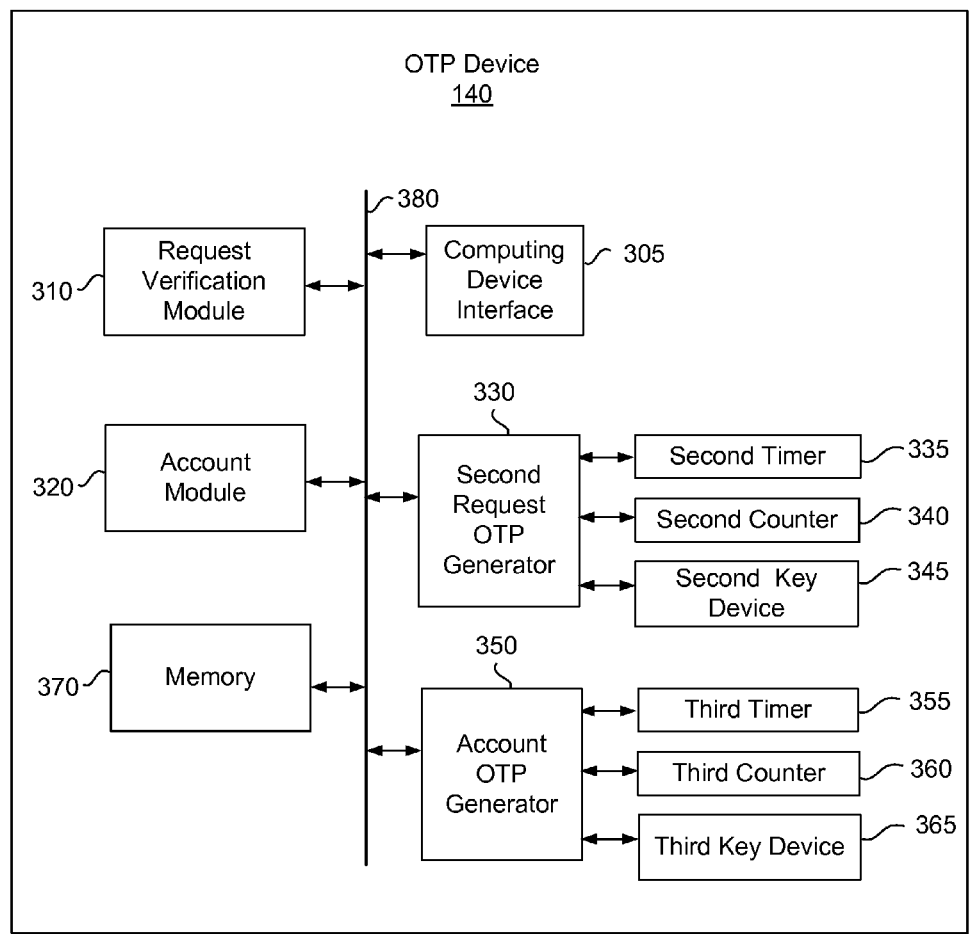
FIG. 3 shows an OTP device according to an aspect of the subject technology.

FIG. 3 shows the OTP device 140 according to an aspect of the subject technology. The OTP device 140 may be a standalone device that the user carries to generate an OTP to gain access to the account. Alternatively, the OTP device 140 may be implemented in a mobile computing device (e.g., a smart phone) that is carried by the user.

The OTP device 140 may comprise a computing device interface 305, a request verification module 310, an account module 320 and a bus 380. The OTP device 140 may also comprise a second request OTP generator 330, a second timer 335, a second counter 340, and a second key device 345. The OTP device may further comprise an account OTP generator 350, a third timer 355, a third counter 360, and a third key device 365. While the OTP device 140 is shown in one configuration in FIG. 3, it is to be understood that the computing device may include additional, alternative and/or fewer components.

The bus 380 collectively represents all system, peripheral, and chipset buses that communicatively connect the numerous components of the OTP device 140. The modules 310 and 320 may be implemented as a set of computer-readable instructions that are stored in a memory and executed by one or more processors to perform the various processes described herein. The modules 310 and 320 may communicate with other components of the OTP device 140 via the bus 380. The modules 310 and 320 are described in further detail below.

The computing device interface 305 enables the OTP device 140 to communicate with the computing device 130. For example, the interface 305 may include a wireless communication module for communicating with the computing device 130 over a wireless link (e.g., a Bluetooth link, a WiFi link, a radio frequency identification (RFID) link, a near-field communication link, an infrared link, etc.). In another example, the interface 305 may communicate with the computing device 130 over a wired link, such as a universal serial bus (USB) link.

The second request OTP generator 330 is configured to generate a request OTP (e.g., each time the OTP device 140 receives a request for an OTP from the computing device 130). The request OTP generated locally by the second request OTP generator 330 is used to verify the request OTP from the computing device 130, as discussed further below.

In one aspect, the second request OTP generator 330 may be time-based. In this aspect, the second request OTP generator 330 may generate a request OTP by inputting a time value from the second timer 335 into an encryption algorithm. The second request OTP generator 330 may also input a secret key from the second key device 345 into the encryption algorithm to generate the request OTP.

In this aspect, the second request OTP generator 330 may be synchronized with the first request OTP generator 230 in the computing device 130 so that the two generators independently generate the same request OTP at approximately the same time. To accomplish this, the second timer 335 may be time-synchronized with the first timer 235 in the computing device 130. For example, the two timers may be initialized at approximately the same time. In another example, the OTP device 140 may send the current time value of the second timer 335 to the computing device 130 and the computing device 130 may use the received time value to synchronize the first timer 235 with the second timer 335. In this example, the current time value may be sent to the computing device 130 via a wired link (e.g., USB link) to prevent an attacker from sniffing the time value or via a wireless link in a secure location (e.g., a location far away from other user). In another example, the second timer 335 may be synchronized with a timer at a remote server and the remote server may synchronize the first time 235 with the second timer 335 using its timer via a secure connection.

In another example, the timers 235 and 335 in both devices 130 and 140 may be synchronized with a remote server. In another example, the OTP device 140 may send its time value to the computing device 130 when the two devices 130 and 140 are first paired, and the computing device 130 may use the received time value to synchronize the first timer 235 with the second timer 335. Alternatively, the computing device 130 may send its time value to the OTP device 140 when the two devices 130 and 140 are first paired, and the OTP device 140 may use the received time value to synchronize the second timer 335 with the first timer 235.

The devices 130 and 140 may employ various techniques to stay synchronized with each other. For example, the OTP device 140 may not only generate a request OTP for the current time value according to the second timer 335, but also generate request OTPs for one or more preceding time values and one or more subsequent time values. When the OTP device 140 receives a request OTP from the computing device 130, the OTP device 140 may compare the received request OTP with the request OTP generated for the current time value. If the two request OTPs match, then the OTP device 140 may conclude that the devices 130 and 140 are still synchronized.

However, if the two request OTPs do not match, then the OTP device 140 may compare the received request OTP with the request OTPs generated for the preceding time values and the subsequent time values for a match. For example, if the received request OTP matches the request OTP generated for the immediately preceding time value, then the OTP device 140 may conclude that the second timer 335 is ahead of the first timer 235 by one time interval. In this case, the OTP device 140 may adjust the second timer 335 accordingly so that the two timers are resynchronized. Similarly, if the received request OTP matches the request OTP generated for the immediately subsequent time value, then the OTP device 140 may conclude that the second timer 335 is behind the first timer 235 by one time interval, and adjust the second timer 335 accordingly to resynchronize the timers.

Thus, the devices 130 and 140 are able to resynchronize with each other when the timers 235 and 335 drift apart by a small amount. Further, if the received request OTP from the computing device 130 matches a request OTP generated for one of the preceding time values or subsequent time values, then the OPT device 140 may still accept the request OTP from the computing device 130 as valid.

In another example, each device 130 and 140 may keep track of how far the respective timer 235 and 335 is into the current time interval. As discussed above, each time value last for about one time interval (e.g., 30 seconds) until the time value changes. In this example, when the computing device 130 sends a request for an OTP to the OTP device 140, the request may also include an indicator indicating how far (e.g., 5 seconds) the first timer 235 is into the current time interval. When the OTP device 140 receives the request, the OTP device 140 may compare how far the first timer 235 is into the current time interval with how far the second timer 335 is into the current time interval. If there is a difference between the two, then the OTP device 140 may adjust the second timer 335 accordingly so that both timers are into the current time interval by approximately the same amount. For example, if the first timer 235 is 5 seconds into the current time interval and the second timer 335 is 10 seconds into the current time interval, then the OTP device 140 may adjust the second timer 335 accordingly so that the second timer 335 is also 5 seconds into the current interval.

The same secret key may be installed in the second key device 345 and the first key device 245. For example, the secret key may be stored on a computer-readable media (e.g., Flask device, thumb drive, DVD, etc.) and copied from the computer-readable media to the computing device 120 and/or the OTP device 140. In another example, the secret key may be downloaded onto the OTP device 140 and/or the computing device 130 from a secure remote server. In another example, the secret key may be written to the OTP device 140 and/or the computing device 130 by a trusted third party. In yet another example, the OTP device 140 may send the secret key to the computing device 130 via a wired link (e.g., USB link) to prevent an attacker from sniffing the secret key or via a wireless link in a secure location (e.g., a location far away from other user). In still another embodiment, the user may manually enter the secret key into the computing device 130 and/or the OTP device 140.

Further, the second request OTP generator 330 may use the same encryption algorithm as the first request OTP generator 230. The same encryption algorithm may be installed on the OTP device 140 and the computing device 120 using any one of the methods described above for the secret key or other method.

In another aspect, the second request OTP generator 330 may be counter-based. In this aspect, the second request OTP generator 330 may generate a request OTP by inputting a count value from the second counter 340 into an encryption algorithm. The second counter 340 may be initialized with an initial count value. After initialization, the second counter 340 may increment the count value each time the OTP device receives a request from the computing device 130 for an OTP for accessing the account. In this aspect, the request OTP generator 330 may also input a secret key from the second key device 345 into the encryption algorithm to generate a request OTP.

In this aspect, the second request OTP generator 330 may be synchronized with the first request OTP generator 230 in the computing device 130 so that the two generators independently generate the same request OTP. To accomplish this, the second counter 340 may be synchronized with the first counter 240 in the computing device 130. For example, the two counters may be initialized to the same count value. In another example, the OTP device 140 may send the current count value of the second counter 340 to the computing device 130 and the computing device 130 may use the received count value to synchronize the first counter 240 with the second counter 340. In this example, the current count value may be sent to the computing device 130 via a wired link (e.g., USB link) to prevent an attacker from sniffing the time value or via a wireless link in a secure location (e.g., a location far away from other user). Further, the same secret key and encryption algorithm may be installed on the OTP device 140 and the computing device 130 using any of the methods discussed above or other method.

The devices 130 and 140 may employ various techniques to stay synchronized with each other. For example, the OTP device 140 may not only generate a request OTP for the current count value according to second counter 340, but also generate request OTPs for one or more preceding count values and one or more subsequent count values. When the OTP device 140 receives a request OTP from the computing device 130, the OTP device 140 may compare the received request OTP with the request OTP generated for the current count value. If the two request OTPs match, then the OTP device 140 may conclude that the devices 130 and 140 are still synchronized.

However, if the two request OTPs do not match, then the OTP device 140 may compare the received request OTP with the request OTPs generated for the preceding count values and the subsequent count values for a match. For example, if the received request OTP matches the request OTP generated for the immediately preceding count value, then the OTP device 140 may conclude that the second counter 340 is ahead of the first counter 240 by one count. In this case, the OTP device 140 may adjust the second counter 340 accordingly so that the two counters are resynchronized. Similarly, if the received request OTP matches the request OTP generated for the immediately subsequent count value, then the OTP device 140 may conclude that the second counter 340 is behind the first counter 240 by one count, and adjust the second counter 340 accordingly to resynchronize the counters.

Thus, the devices 130 and 140 are able to resynchronize with each other when the counters 240 and 340 drift apart by a small amount. Further, if the received request OTP from the computing device 130 matches a request OTP generated for one of the preceding count values or subsequent count values, then the OPT device 140 may still accept the request OTP from the computing device 130 as valid.

In one aspect, the OTP device 140 may be configured to receive OTP requests from multiple computing devices. For example, the user may use different computing devices to access the account at different times (e.g., a desktop computer when the user is at home and/or work and a laptop computer when the user is traveling). In this aspect, the OTP device 140 may include an access list of computing devices that are authorized to request an OTP for accessing the account. For each authorized computing device, the access list may include an identifier identifying the device (e.g., a MAC address, an IP address and/or other identifier). The list may be stored on a memory 370 in the OTP device 140. Each computing device authorized to request an OTP from the OTP device 140 may be implemented using the components shown in FIG. 3.

For the aspect in which the second request OTP generator 330 is counter-based, the OTP device may include a separate counter for each authorized computing device, where each counter is synchronized with the counter in the respective computing device. In this example, when the OTP device 140 receives a request from a particular computing device, the OTP device 140 may increment the count value of the local counter corresponding to the computing device.

The request verification module 310 is configured to verify a request for an OTP from the computing device 130. As discussed above, the request may include an identifier (e.g., MAC address, IP address and/or other identifier) identifying the computing device 130 and a request OTP generated by the first request OTP generator 230 in the computing device 130. In one aspect, the request verification module 310 may first determine whether the computing device 130 is in the access list of computing devices authorized to request an OTP from the OTP device 140. The request verification module 310 may do this by determining whether the identifier in the request from the computing device 130 matches one of the identifiers in the access list.

If the computing device 130 is in the access list, then the request verification module 310 may verify the request OTP from the computing device 130. The request verification module 310 may do this by instructing the second request OTP generator 330 to generate a request OTP and provide the locally generated request OTP to the request verification module 310. If the locally generated request OTP matches the request OTP from the computing device 130, then the request verification module 310 may determine that the request OTP from the computing device 130 is valid. After the request OTP from the computing device 130 is found valid, the OTP device 140 may grant the request by generating an OTP for accessing the account and sending the generated OTP to the computing device 130, as discussed further below.

The account OTP generator 350 is configured to generate an OTP for accessing the account. In one aspect, the account OTP generator 350 may be time-based, in which the account OTP generator 350 generates an OTP by inputting a time value from the third timer 355 into an encryption algorithm. The account OTP generator 350 may also input a secret key from the third key device 365 into the encryption algorithm. The third timer 355 may be time-synchronized with a corresponding timer at the authentication server 140 so that the account OTP generator 350 independently generates the same OTP as a corresponding OTP generator at the authentication server 140. Methods for time syncing an OTP device with an authentication server are known in the art, and therefore not described here in detail for brevity. In this aspect, the second timer 335 need not be synchronized with the third timer 355. In addition different secret keys and/or different encryption algorithms may be installed for the account OTP generator 350 and the second request OTP generator 330.

In another aspect, the account OTP generator 350 may be counter-based, in which the account OTP generator 350 generates an OTP by inputting a count value from the third counter 360 into an encryption algorithm. The account OTP generator 350 may also input a secret key from the third key device 365 into the encryption algorithm. The third counter 360 may be synchronized with a corresponding counter at the authentication server 140 so that the account OTP generator 350 independently generates the same OTP as a corresponding OTP generator at the authentication server 120. In this aspect, the second counter 340 need not be synchronized with the third counter 360. In addition different secret keys and/or different encryption algorithms may be installed for the account OTP generator 350 and the second request OTP generator 330.

The account module 320 is configured to send an OTP for accessing the account to the computing device 130 when the request verification module 310 successfully verifies that the computing device 130 is authorized to request the OTP. In one aspect, the account module 320 may instruct the account OTP generator 350 to generate an OTP for accessing the account. The account module 320 may then send the generated OTP to the computing device 130 via the computing device interface 305. As discussed above, the login module 260 in the computing device receives the OTP from the OTP device 140 and sends the received OTP to the authentication server 120 to access the account.

Figure 4:
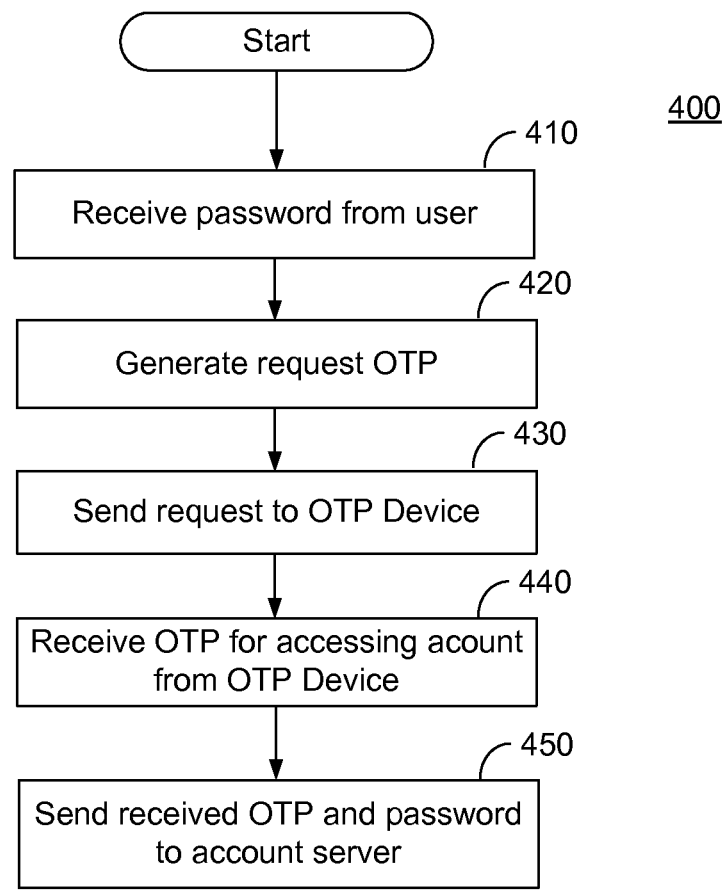
FIG. 4 shows a flowchart of a method for authenticating a computing device according to an aspect of the subject technology.

FIG. 4 shows a flowchart of a process for authenticating the computing device 130 according to an aspect of the subject technology.

In step 410, the computing device 130 receives a password from the user. For example, the user may be prompted for a password when the user wants to log into an account and the user may enter the password into the computing device 130 (e.g., via a keyboard).

In step 420, the computing device 130 generates a request OTP. For example, the first request OTP generator 230 may generate the request OTP, as discussed above.

In step 430, the computing device 130 sends a request for an OTP to the OTP device 140. The request may include the request OTP generated in step 420 and an identifier identifying the computing device 130. The computing device 130 may send the request to the OTP device via a wireless link In step 440, the computing device receives an OTP for accessing the account from the OTP device in response to the request sent in step 430.

In step 450, the computing device 130 sends the OTP received from the OTP device and the password to the authentication server 120 to gain access to the account.

FIG. 4 shows an example of a two-factor authentication process, in which two types of passwords are presented to the authentication server 120 for authentication. The first type includes the password from the user and the other type includes the OTP received from the OTP device 140. Alternatively, the password from the user may be omitted from the authentication process, in which case step 410 may be omitted and the password may be omitted from step 450.

Figure 5:
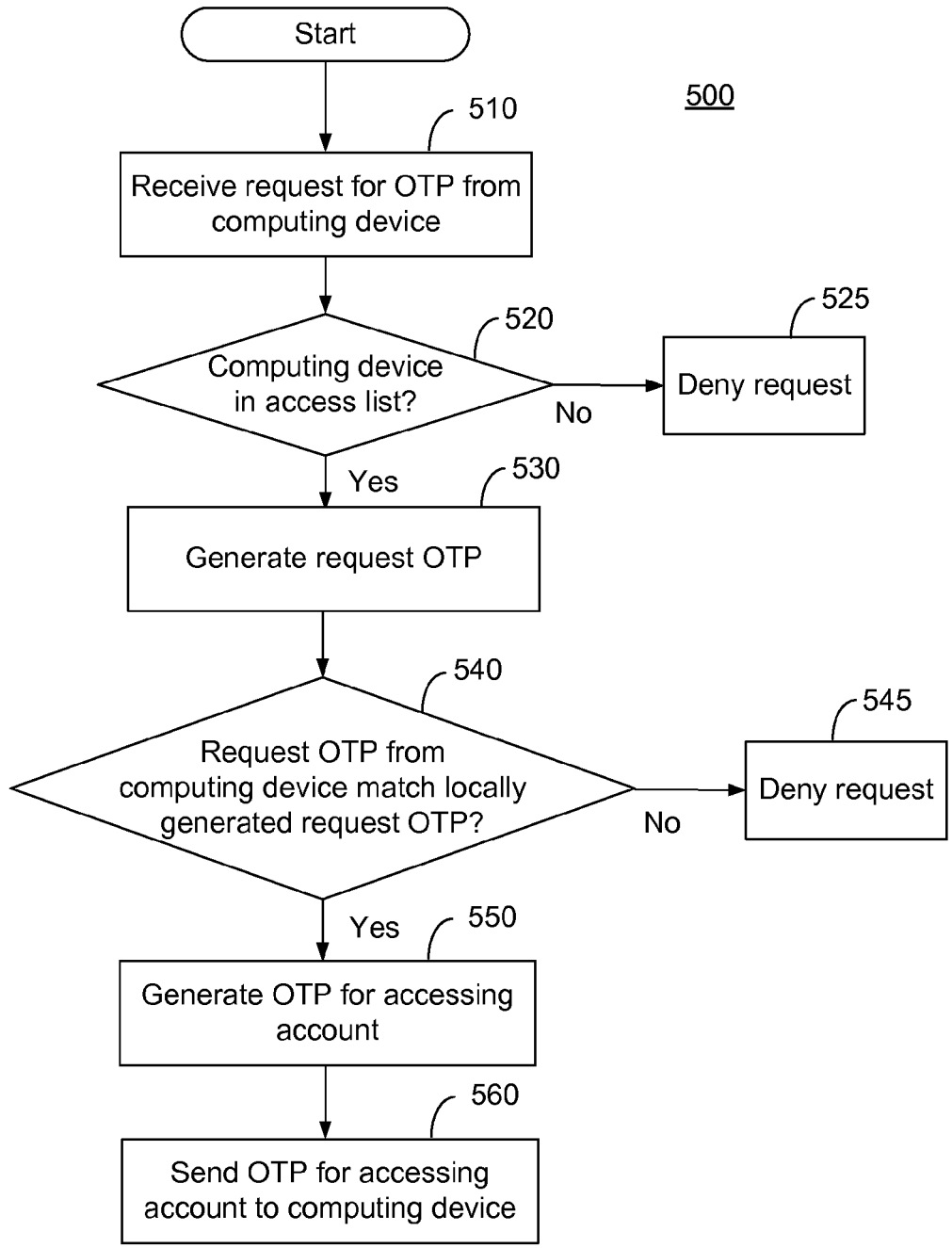
FIG. 5 shows a flowchart of a method for providing an OTP for accessing a secure account according to an aspect of the subject technology.

FIG. 5 shows a flowchart for providing an OTP for accessing a secure account according to an aspect of the subject technology.

In step 510, the OTP device 140 receives a request for an OTP from the computing device 130. The request may include a request OTP generated at the computing device and an identifier identifying the computing device 130.

In step 520, the OTP 140 device determines whether the requesting computing device 130 is in an access list of computing devices authorized to request an OTP. For example, the OTP device 140 may determine whether the identifier from the computing device 130 matches one of the identifiers in the access list. If the computing device 130 is not in the access list, then the OTP device denies the request from the computing device 130 in step 525. Otherwise, the process proceeds to step 530.

In step 530, the OTP device 140 generates a local request OTP. For example, the second request OTP generator 330 may generate the local request OTP, as discussed above.

In step 540, the OTP device 140 determines whether the request OTP received from the computing device 130 matches the locally generated request OTP. If the two request OTPs do not match, then the OTP device denies the request from the computing device 130 in step 545. Otherwise, the process proceeds to step 550.

In step 550, the OTP device 140 generates an OTP for accessing the secure account For example, the account OTP generator 350 may generate the OTP, as discussed above.

In step 560, the OTP device 140 sends the generated OTP for accessing the account to the computing device 130. The OTP device 140 may send the generated OTP to the computing device 130 via a wireless link.

In one aspect, the OTP device 140 may generate a plurality of request OTPs in step 530 instead of one. For example, for a time-based OTP device 140, the OTP device 140 may generate request OTPs for its current time value, one or more preceding time values and one or more subsequent time values. Similarly, for a counter-based OTP device 140, the OTP device 140 may generate request OTPs for its current count value, one or more preceding count values and one or more subsequent count values. In this example, if the request OTP from the computing device matches one of the locally generated OTP requests in step 540, then the OTP device 140 may declare the request OTP from the computing device valid and proceed to step 550.

Various aspects of the subject technology prevent a secure account from being accessed by an unauthorized user. For example, suppose an attacker is able to pair with the OTP device with a device impersonating the computing device 130. Also suppose that the attacker has obtained the identifier (e.g., MAC address, IP address, etc.) of the computing device 130 (e.g., by hacking into another user account, sniffing wireless communications from the computing device 130 and/or other means), and the attacker's device uses the obtained identifier to identify itself as the computing device 130. In this example, the attacker's device will still not be able to obtain a valid OTP from the OTP device 140. This is because the attacker's device will not be able to generate a valid request OTP. As a result, the OTP device 140 will deny a request for an OTP from the attacker's device.

In one aspect, the OTP device 140 may alert the user when a computing device 130 requests an OTP from the OTP device 140. For example, when the OTP device 140 receives a request for an OTP, the OTP device 140 may output a distinctive sound (e.g., beep) and/or vibrate to alert the user that an OTP is being requested. If the user is not requesting the OTP, then the user may stop the OTP device 140 from transmitting the OTP by quickly entering a command into the OTP device 140 (e.g., via a keypad on the OTP device 140). The user may also prevent unauthorized access to the account by informing the authentication server and/or an administrator of the account to deny access to the account even if a valid OTP is presented.

In the examples discussed above, the secure account is located on a remote network server. However, the subject technology is not limited to an account on a network server, and may apply equally well to a local account that is located at the computing device 130. In this case, access to the local account may be controlled by a local authentication system that independently generates an OTP for accessing the account. The local authentication system may grant access to the local account if the OTP from the OTP device matches the locally generated OTP and the user password matches a password stored in a memory of the computing device 130.

Figure 6:
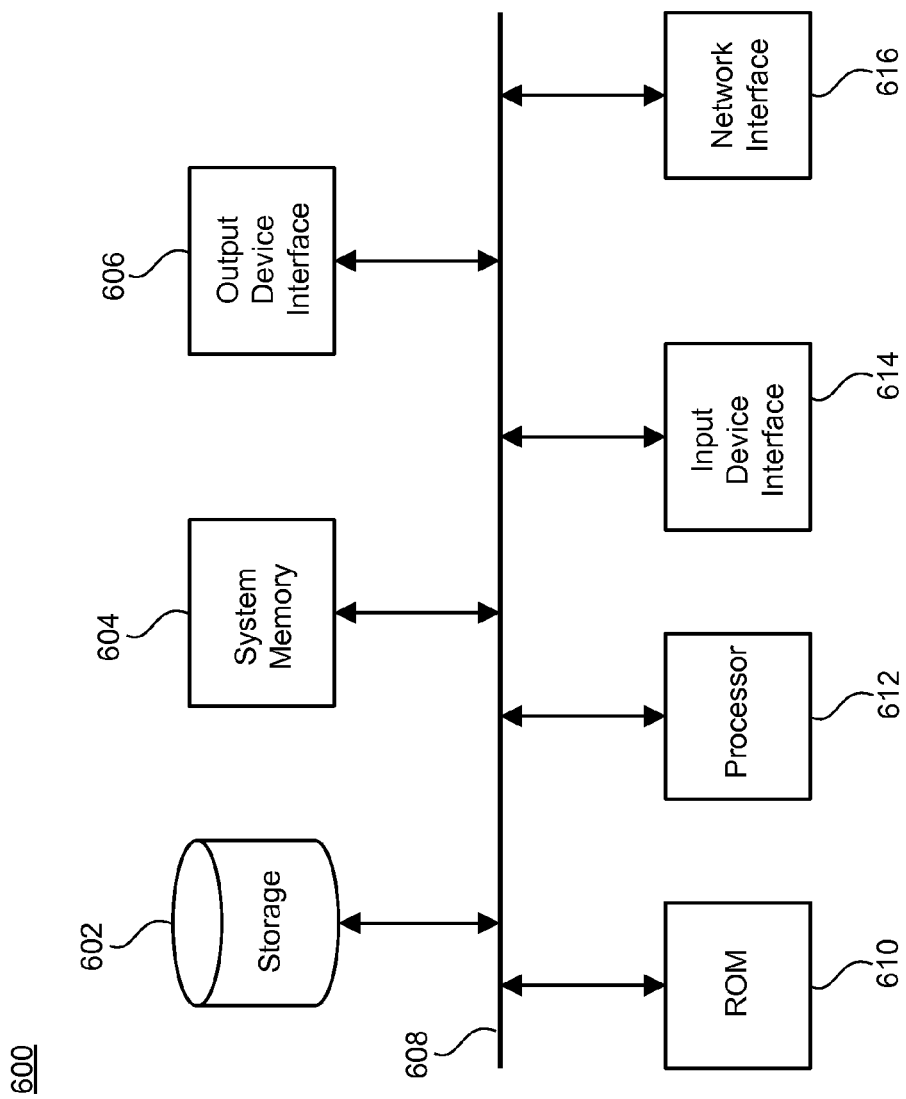
FIG. 6 conceptually illustrates an electronic system with which some implementations of the subject technology may be implemented.

FIG. 6 conceptually illustrates an electronic system with which some implementations of the subject technology may be implemented. For example, the electronic system may be used to implement the OTP device 140 and/or the computing device 130. Electronic system 600 includes a bus 608, processing unit(s) 612, a system memory 604, a read-only memory (ROM) 610, a permanent storage device 602, an input device interface 614, an output device interface 606 and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. For example, each module in the OPT device 140 and/or the computing device 130 may include instructions that are stored in one or more of the memory units and executed by the processing unit(s) 612 to implement the processes of the module. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD).

Finally, as shown in FIG. 6, bus 608 also couples electronic system 600 to a network (not shown) through a network interface 616. In this manner, the electronic system 600 can be a part of a network of computers (such as a local area network (LAN), a wide area network (WAN), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing access to secure information, the method comprising:
   receiving, at a portable one-time password (OTP) device, a first OTP from a computing device attempting to access secure information from a system and generated by the computing device;
   verifying, by the portable OTP device, whether the first OTP is valid, wherein verifying whether the first OTP is valid comprises:
   generating a plurality of OTPs;
   determining, by the portable OTP device, whether the first OTP matches one of the plurality of OTPs; and
   if the first OTP matches one of the plurality of OTPs, then determining that the first OTP is valid; and
   if the first OTP is valid, then performing the operations of:
   generating, by the portable OTP device, a second OTP for accessing the secure information; and
   transmitting, by the portable OTP device, the second OTP to the computing device.

2. The method of claim 1, wherein generating the plurality of OTPs comprises inputting a time value from a first timer into a first encryption algorithm to generate at least one of the plurality of OTPs, wherein the first timer is synchronized with a second timer in the computing device.

3. The method of claim 2, wherein generating the second OTP comprises inputting a time value from a third timer into a second encryption algorithm to generate the second OTP, wherein the first and second encryption algorithms are different.

4. The method of claim 2, wherein generating the second OTP comprises inputting a time value from a third timer into a second encryption algorithm to generate the second OTP, wherein the third timer and the first timer are asynchronous.

5. The method of claim 2, wherein generating the second OTP comprises inputting a count value from a counter into a second encryption algorithm to generate the second OTP.

6. The method of claim 5, wherein the count value is incremented each time a user logs into an account including the secure information.

7. The method of claim 1, wherein generating the plurality of OTPs comprises, for at least one of the plurality of OTPs, inputting a count value from a first counter into a first encryption algorithm to generate the at least one of the plurality of OTPs, wherein the first counter is synchronized with a second counter in the computing device.

8. The method of claim 7, wherein generating the second OTP comprises inputting a count value from a third counter into a second encryption algorithm to generate the second OTP, wherein the first and second encryption algorithms are different.

9. The method of claim 7, wherein generating the second OTP comprises inputting a count value from a third counter into a second encryption algorithm to generate the second OTP, wherein the third counter and the first counter are asynchronous.

10. The method of claim 1, wherein the plurality of OTPs are generated using a current time value from a timer, one or more time values preceding the current time value and one or more time values subsequent to the current time value.

11. The method of claim 1, wherein the plurality of OTPs are generated using a current count value from a counter, one or more count values preceding the current count value and one or more count values subsequent to the current count value.

12. The method of claim 1, further comprising:
    generating, by the OTP device, an alert indicating that the first OTP has been received.

13. A portable one-time password (OTP) device for providing access to secure information, the device comprising:
    one or more processors; and
    a machine-readable medium comprising instructions stored therein, which when executed by the one or more processors, cause the one or more processors to perform operations comprising:
    receiving via a wireless link a first OTP and an identifier from a computing device attempting to access secure information from a system the first OTP generated by the computing device;
    determining whether the received identifier is in an access list;
    verifying, by the portable OTP device, whether the first OTP is valid, wherein verifying whether the first OTP is valid comprises:
    generating a plurality of OTPs;
    determining, by the portable OTP device, whether the first OTP matches one of the plurality of OTPs; and
    if the first OTP matches one of the plurality of OTPs, then determining that the first OTP is valid; and
    if the first OTP is valid and the received identifier is in the access list, then performing the operations of:
    generating, by the portable OTP device, a second OTP for accessing the secure information; and
    transmitting the second OTP to the computing device via the wireless link.

14. The system of claim 13, wherein instructions, when executed by the one or more processors, further cause the one or more processors to perform operations comprising:
    generating, by the OTP device, an alert indicating that the first OTP has been received.

15. A non-transitory machine-readable medium comprising instructions stored therein, which when executed by a machine, cause the machine to perform operations comprising:
    receiving, at a portable one-time password (OTP) device via a wireless link, a first OTP from a computing device attempting to access secure information from a system the first OTP generated by the computing device;
    generating, by the portable OTP device, a second OTP;
    verifying, by the portable OTP device, whether the first OTP matches the second OTP; and
    if the first OTP matches the second OTP, then performing the operations of:
    generating, by the portable OTP device, a third OTP for accessing the secure information, wherein the third OTP is different from the first OTP; and
    transmitting, by the portable OTP device, the third OTP to the computing device via the wireless link.

16. The non-transitory machine-readable medium of claim 15, wherein the instructions, when executed by the machine, further cause the machine to perform operations comprising:
  generating, by the OTP device, an alert indicating that the first OTP has been received.

* * * * *